United States Patent
Tyler

(10) Patent No.: US 10,766,191 B2
(45) Date of Patent: Sep. 8, 2020

(54) ADDITIVE MANUFACTURING SYSTEM HAVING IN-HEAD FIBER WEAVING

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 649 days.

(21) Appl. No.: 15/608,017

(22) Filed: May 30, 2017

(65) Prior Publication Data

US 2018/0065144 A1    Mar. 8, 2018

Related U.S. Application Data

(60) Provisional application No. 62/383,801, filed on Sep. 6, 2016.

(51) Int. Cl.
| | | |
|---|---|---|
| B29C 64/209 | (2017.01) | |
| B29C 64/264 | (2017.01) | |
| B29C 64/106 | (2017.01) | |
| B33Y 10/00 | (2015.01) | |
| B33Y 30/00 | (2015.01) | |
| B33Y 50/02 | (2015.01) | |

(Continued)

(52) U.S. Cl.
CPC ........ *B29C 64/209* (2017.08); *B29C 35/0805* (2013.01); *B29C 64/106* (2017.08); *B29C 64/264* (2017.08); *B33Y 10/00* (2014.12); *B33Y 30/00* (2014.12); *B33Y 50/02* (2014.12); *B05D 1/26* (2013.01); *B29C 48/154* (2019.02); *B29C 48/2556* (2019.02); *B29C 48/266* (2019.02); *B29C 48/30* (2019.02); *B29C 48/301* (2019.02); *B29C 48/304* (2019.02); *B29C 64/188* (2017.08); *B29C 2035/0827* (2013.01); *B29K 2105/0058* (2013.01); *B29K 2105/08* (2013.01); *B33Y 70/00* (2014.12); *D03D 15/12* (2013.01)

(58) Field of Classification Search
None
See application file for complete search history.

(56) References Cited

U.S. PATENT DOCUMENTS

| | | |
|---|---|---|
| 3,286,305 A | 11/1966 | Seckel |
| 3,809,514 A | 5/1974 | Nunez |

(Continued)

FOREIGN PATENT DOCUMENTS

| | | |
|---|---|---|
| DE | 4102257 A1 | 7/1992 |
| EP | 2589481 B1 | 1/2016 |

(Continued)

OTHER PUBLICATIONS https://en.wikipedia.org/wiki/Weaving (retrieved Mar. 30, 2020) (Year: 2020).*

(Continued)

*Primary Examiner* — Timothy Kennedy
(74) *Attorney, Agent, or Firm* — Ryan C. Stockett

(57) ABSTRACT

A system is disclosed for use in additively manufacturing a composite structure. The system may include a head configured to discharge a composite material including a matrix and a plurality of continuous reinforcements. The system may also include a weave mechanism configured to selectively adjust a pattern of weaving of the plurality of continuous reinforcements occurring inside of the head.

20 Claims, 4 Drawing Sheets

(51) Int. Cl.

| | | |
|---|---|---|
| *B29C 35/08* | (2006.01) | |
| *B29C 48/30* | (2019.01) | |
| *B29C 48/154* | (2019.01) | |
| *B29C 48/255* | (2019.01) | |
| *B29C 48/25* | (2019.01) | |
| *B29C 64/188* | (2017.01) | |
| *B29K 105/00* | (2006.01) | |
| *B29K 105/08* | (2006.01) | |
| *B05D 1/26* | (2006.01) | |
| *D03D 15/12* | (2006.01) | |
| *B33Y 70/00* | (2020.01) | |

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,089,727 A | 5/1978 | McLain |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,803,003 B2 | 10/2004 | Rigali et al. |
| 6,934,600 B2 | 8/2005 | Jang et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2004/0254633 A1 | 12/2004 | Rapaport et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0102578 A1* | 4/2014 | Bartel .................. B29C 70/205 138/123 |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0271966 A1* | 9/2014 | Giloh .................. B29C 64/386 425/166 |
| 2014/0291886 A1 | 10/2014 | Mark et al. |
| 2015/0136455 A1 | 5/2015 | Fleming |
| 2015/0321441 A1 | 11/2015 | Marcoe et al. |
| 2015/0375340 A1* | 12/2015 | Cui ....................... B29C 64/153 428/188 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0136887 A1 | 5/2016 | Guillemette et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |

(56) References Cited

U.S. PATENT DOCUMENTS

| | | |
|---|---|---|
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017 08758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS https://feltmagnet.com/textiles-sewing/What-are-the-main-differences-between-Weaving-and-Knitting (retrieved Mar. 30, 2020) (Year: 2020).* https://www.compositesworld.com/articles/how-is-knitting-different (retrieved Mar. 30, 2020) (Year: 2020).*

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995), cited by applicant.

M. Martin-Gallego et al., Epoxy-Graphene UV-Cured Nanocomposites, Polymer, vol. 52, Issue 21, pp. 4664-4669 (Sep. 2011)

P. Compston, J. Schierner, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No, 6, pp, 397-405 (2007).

M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

ADDITIVE MANUFACTURING SYSTEM HAVING IN-HEAD FIBER WEAVING

RELATED APPLICATIONS

This application is based on and claims the benefit of priority from U.S. Provisional Application No. 62/383,801 that was filed on Sep. 6, 2016, the contents of all of which are expressly incorporated herein by reference.

TECHNICAL FIELD

The present disclosure relates generally to a manufacturing system and, more particularly, to an additive manufacturing system having in-head fiber weaving.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in fiber configuration.

The disclosed system is directed to addressing one or more of the problems set forth above and/or other problems of the prior art.

SUMMARY

In one aspect, the present disclosure is directed to an additive manufacturing system. The additive manufacturing system may include a head configured to discharge a composite material including a matrix and a plurality of continuous reinforcements. The additive manufacturing system may also include a weave mechanism configured to selectively adjust a pattern of weaving of the plurality of continuous reinforcements occurring inside of the head.

In another aspect, the present disclosure is directed to another additive manufacturing system. This additive manufacturing system may include a head configured to discharge a composite material including a matrix and a plurality of continuous reinforcements, and a support configured to move the head in multiple dimensions during discharging by the head. The additive manufacturing system may also include a weave mechanism configured to selectively adjust a pattern of weaving of the plurality of continuous reinforcements occurring inside of the head, and a controller. The controller may be configured to receive information regarding a structure to be manufactured with the composite material, and to coordinate operation of the weave mechanism with movement of the head based on the information.

In yet another aspect, the present disclosure is directed to a head for an additive manufacturing system. The head may include a housing having a supply end configured to receive a plurality of reinforcements, and a discharge end configured to discharge the plurality of reinforcements after being coated with a matrix material. The head may also include a first fiber guide having at least one guide hole configured to receive at least a first of the plurality of reinforcements, and a second fiber guide having at least one guide hole configured to receive at least a second of the plurality of reinforcements. The head may further include a nozzle tip located at the discharge end of the housing and configured to receive the at least the first and the at least the second of the plurality of reinforcements, and an actuator configured to selectively cause the first and second fiber guides to move relative to each other.

DETAILED DESCRIPTION

Figure 1:
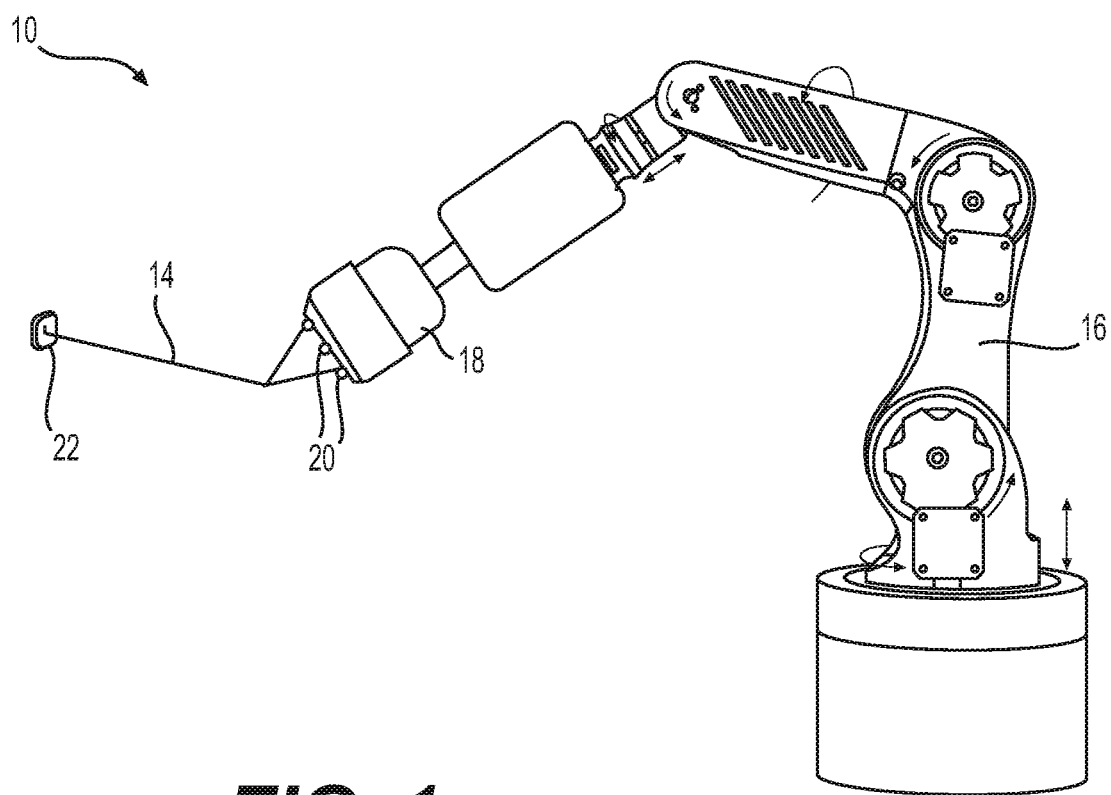
FIGS. 1 and 2 are diagrammatic illustrations of exemplary disclosed manufacturing systems.
Figure 2:
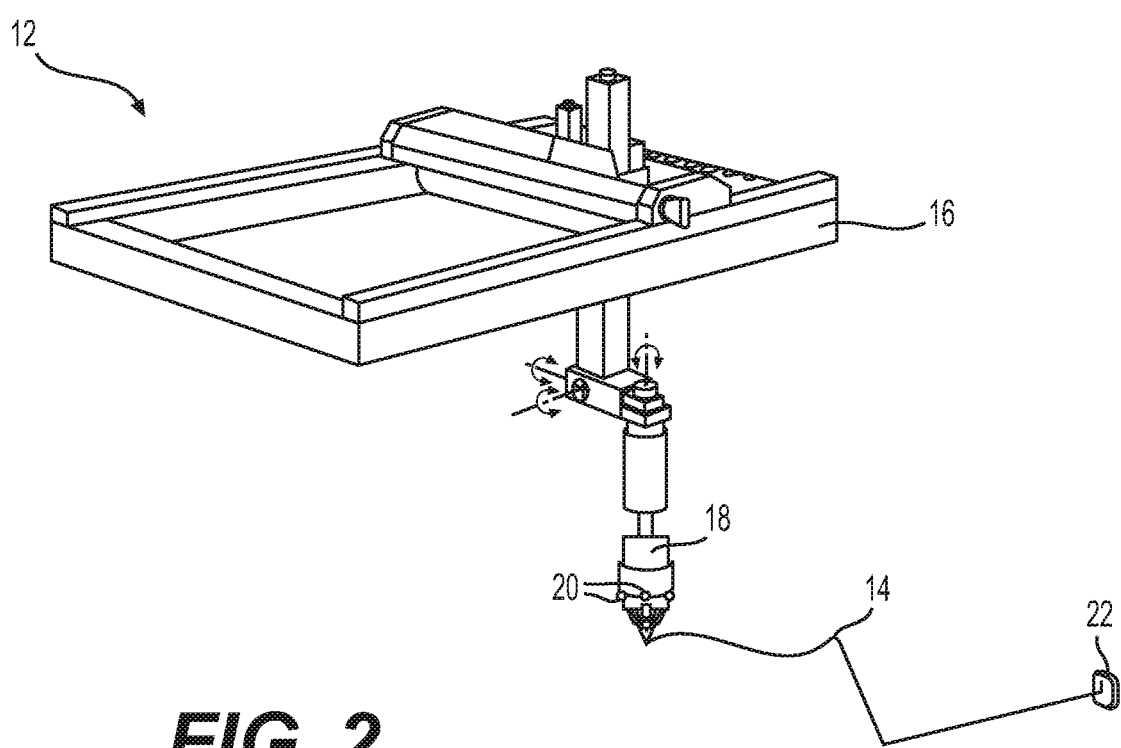

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, epoxy resins, polyester resins, cationic epoxies, acrylated epoxies, urethanes, esters, thermoplastics, photopolymers, polyepoxides, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal head mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

Figure 3:
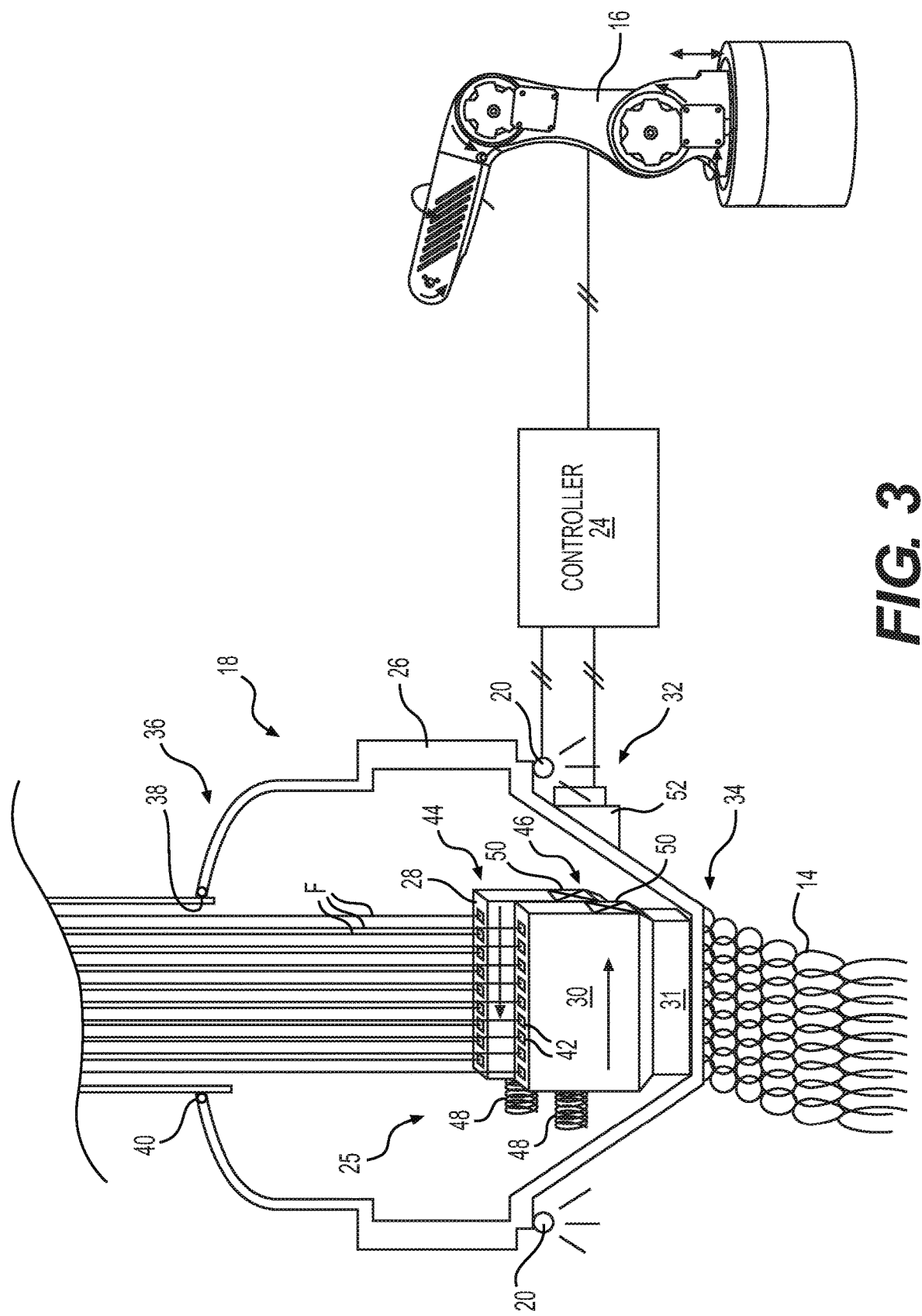
FIGS. 3-6 are diagrammatic illustrations of exemplary disclosed heads that may be used in conjunction with the manufacturing systems of FIGS. 1 and 2.

An exemplary control arrangement is shown in FIG. 3 that may be used to regulate operation of system 10 and/or 12 (referring to FIG. 1). As can be seen in this figure, a controller 24 is provided and shown as being communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement to be discharged at a particular location within structure 14. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20 such that structure 14 is produced in a desired manner.

As can be also seen in FIG. 3, head 18, under the regulation of controller 24, may selectively implement internal weaving of reinforcements. For example, a plurality of reinforcements of any type, shape, and size may be separately supplied to head 18 (e.g., from support 16 and/or other external sources), and an internal weave mechanism 25 may be controlled to selectively weave the reinforcements based on a specified pattern, density, etc. relative to a current manufacturing progress and/or location of structure 14. Internal weave mechanism 25 may include, among other things, a housing 26, a plurality of fiber guides (e.g., first and second fiber guides 28, 30) disposed inside of housing 26, a common nozzle tip 31 configured to receive reinforcements from all of the fiber guides, and at least one actuator 32 configured to selectively move the fiber guides relative to each other. As will be explained in more detail below, matrix-coated reinforcements may pass through the fiber guides, where a relative movement between the reinforcements may be generated by the moving fiber guides. The matrix-coated reinforcements may then discharge from housing 26, where resin in the matrix material may be caused to cure from the outside-in by way of cure enhancer(s) 20. This may allow for a first configuration of reinforcements to be dynamically changed to a second configuration of reinforcements, without halting of structure manufacturing.

Housing 26 may be generally tubular, spherical, or cuboid, and have a discharge end 34 and an opposing supply end 36. An inner diameter of housing 26 may be larger than outer diameters of fiber guides 28, 30, and an internal axial length of housing 26 may be greater than axial lengths of fiber guides 28, 30. With this arrangement, fiber guides 28, 30 may fit at least partially inside housing 26. In the disclosed embodiment, both fiber guides 28, 30 are supported completely inside of housing 26. A center opening 38 may be formed within supply end 36 of housing 26, allowing composite material (e.g., matrix material and/or reinforcements) and support components (e.g., a shaft, an axle, a supply tube, control lines, power, etc. that connect head 18 to support 16) to pass axially therethrough. In some embodiments, a seal (e.g., an o-ring, a gasket, etc.) 40 may be disposed at opening 38 and around the support components to inhibit matrix material from leaking out of housing 26.

Although shown as having a generally box-like shape with a rectangular cross-section, each of fiber guides 28, 30 could have any desired shape and cross-section. Each fiber guide may be supported within housing 26 in such a manner that allows relative movement therebetween. For example, each fiber guide could be situated within a corresponding slot, track, bushing, bearing and/or other construction that maintains a general orientation and alignment of each fiber guide as the fiber guides are shuttled transversely in reciprocating directions.

A plurality of guide holes 42 may be formed within each of fiber guides 28, 30 and arranged in any desired configuration (e.g., in a straight line, in an arc, etc.). Guide holes 42 may each be configured to receive a separate reinforcement (represented by F in FIG. 3) or grouping of reinforcements. Guide holes 42 may extend from a supply end 44 of the associated guide, to a discharge end 46, which feeds into tip 31. Tip 31 may then function as a funnel and/or die, collecting and/or coalescing the reinforcements from all guide holes 42.

Actuator 32 may be configured to selectively generate the relative motion (e.g., a side-to-side) between fiber guides 28, 30. In one embodiment, actuator 32 includes at least one resilient member (e.g., a spring) 48 associated with each fiber guide 28, 30; at least one internal magnet (e.g., a permanent magnet) 50 associated with each fiber guide 28, 30; and at least one external magnet (e.g., an electro-magnet) 52. Spring 48 may be located at only one lateral side of each fiber guide 28, 30 or at opposing sides, and be configured to exert a biasing force (e.g., a compression and/or tensile force) in opposition to a magnetic force exerted by interaction between permanent magnet(s) 50 and electro-magnet 52. One permanent magnet 50 may be affixed to only one or both lateral sides of each corresponding fiber guide 28, 30, while electro-magnet 52 may be located within a wall (e.g., inside or outside) of housing 26.

Controller 24 may be configured to selectively energize electro-magnet 52, thereby generating a temporary magnetic field passing through each permanent magnet 50. An intermittent interaction of the temporary magnetic field with permanent magnets 50 may generate forces on fiber guides 28, 30 that, when combined with the biasing forces of spring(s) 48, cause fiber guides 28, 30 to oscillate (e.g., to move left-and-right relative to the perspective of FIG. 3). When two dedicated electro-magnets 52 are utilized (e.g., one for each fiber guide 28, 30), controller 24 may be configured to selectively energize each electro-magnet 52 at different times and/or by different amounts, such that the guide holes 42 of the respective guides translate or swing past each other at different times and/or by different distances. This relative movement of guide holes 42 may cause the associated reinforcements exiting guide holes 42 to approach and/or overlap each other, thereby dynamically creating an infinite number of adjustable weave patterns that pass through tip 31 and exit head 18 to harden when exposed to the radiation of cure enhancer(s) 20.

It is contemplated that fiber guides 28, 30 may be moved in the same direction, moved in directions counter to each other, moved continuously, moved intermittently, have smaller or larger movement ranges, move at adjustable and/or different speeds (e.g., relative to a discharge rate of head 18), etc. These variations may result in unique and/or dynamically changing weave patterns having desired properties. In addition, the movements of fiber guides 28, 30 may be choreographed with the movements of support 16, with the movements of head 18, with an axial discharge distance and/or rate, and/or with known geometry of structure 14 (e.g., termination points, coupling points, tees, diametrical changes, splices, turns, high-pressure and/or high-temperature areas, etc.).

It is also contemplated that, in some embodiments, only one of fiber guides 28 or 30 may oscillate, while the other of fiber guides 28, 30 remains stationary. This may still result in dynamically changing weave patterns, but require a less complex head configuration. In some embodiments, a single electro-magnet 52 could be utilized to drive opposing motions of fiber guides 28, 30, for example by placing permanent magnets of opposing polarity within fiber guides 28, 30. In other configurations, two electro-magnets 52 may be required. Other configurations may also be possible.

Figure 4:
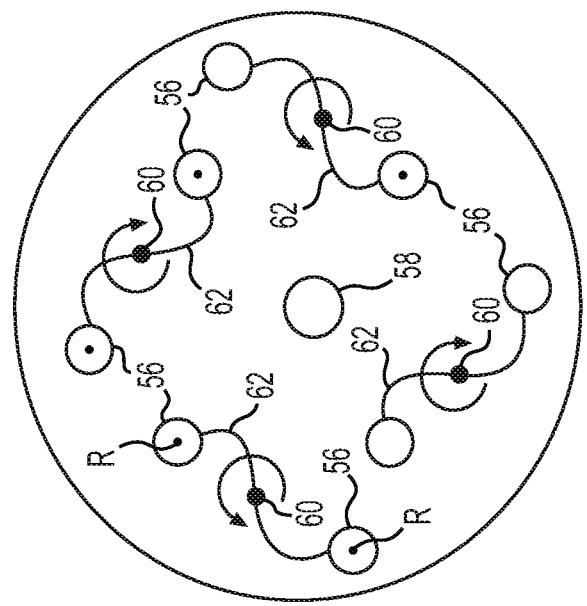
Figure 5:
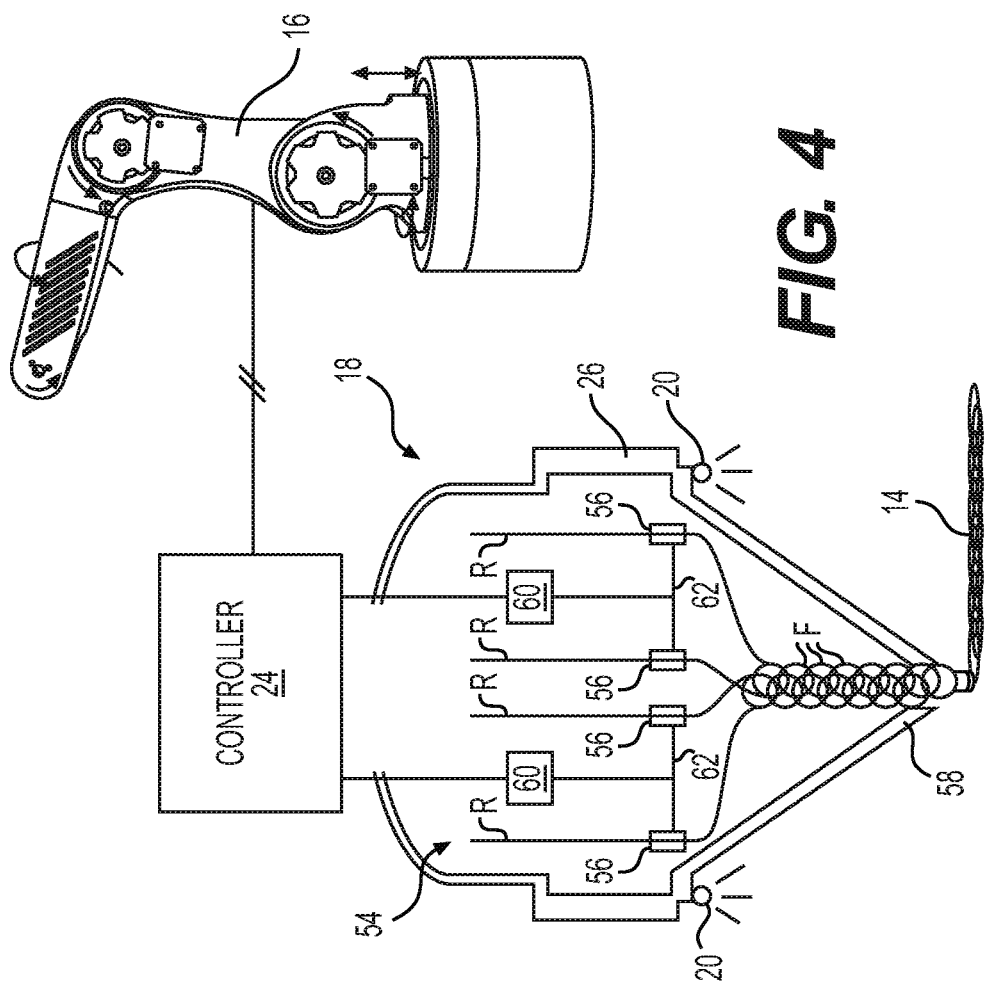

As can be also seen in FIGS. 4 and 5, head 18 could include a different internal weave mechanism 54, if desired. In this example, a plurality of reinforcements (represented by R in FIGS. 4 and 5) of any type, shape, and size may be separately supplied to head 18 (e.g., from support 16 and/or other external sources), and weave mechanism 54 may be controlled to selectively weave the reinforcements R based on a specified pattern, density, etc. relative to a current manufacturing progress and/or location of structure 14. Weave mechanism 54 may include, among other things, a plurality of fiber guides 56 disposed inside of housing 26, a common nozzle tip 58 configured to receive reinforcements from all fiber guides 56, and at least one actuator 60 configured to selectively move fiber guides 56 relative to each other. As will be explained in more detail below, matrix-coated reinforcements R may pass through fiber guides 56, where a relative movement between the reinforcements R may be generated by the moving fiber guides 56. The matrix-coated reinforcements may then discharge from head 18 via nozzle tip 58, where resin in the matrix material may be caused to cure from the outside-in by way of cure enhancer(s) 20. This may allow for a first configuration of reinforcements to be dynamically changed to a second configuration of reinforcements, without halting of structure manufacturing.

Although shown as having a generally cylindrical shape with a circular cross-section, each fiber guide 56 could have any desired shape and cross-section. One or more guide holes may be formed within each fiber guide 56 and arranged in any desired configuration (e.g., in a straight line, in an arc, etc.). The guide hole(s) may each be configured to receive a separate reinforcement R or grouping of reinforcements R. Each fiber guide 56 may be supported within housing 26 in such a manner that allows relative movement therebetween. For example, one or more (e.g., two) fiber guides 56 could be connected to a lever arm 62 (e.g., a straight or curved arm, such as an S-shaped arm) that is pinned (e.g., at its center point) to housing 26. In this configuration, rotation of lever arm 62 about the center point may result in rotation of any connected fiber guides 56. In one embodiment, a single fiber guide 56 is connected at each opposing end of a common lever arm 62.

Actuator 60 may be a motor (e.g., electrically powered motor, pneumatically powered motor, hydraulically powered motor, etc.) that is connected to rotate each lever arm 62 and the associated fiber guides 56. In some embodiments, one actuator 60 may be able to rotate multiple lever arms 62, for example via a chain, a belt, or a gear train. With this configuration, controller 24 may be able to selectively energize actuator(s) 60, thereby causing lever arms 62 to rotate the corresponding fiber guides 56 toward and/or past a center of head 18 (e.g., past a center of nozzle tip 58). In doing so, one or more reinforcements R may be moved toward each other and/or overlapped, thereby creating a weave of reinforcements that feeds into nozzle tip 31. Nozzle tip 31 may then function as a funnel and/or die, collecting and/or coalescing the reinforcements from all fiber guides 56. The weave of reinforcements R may exit head 18 and harden when exposed to the radiation of cure enhancers 20.

It is contemplated that fiber guides 56 may be moved in the same direction, moved in directions counter to each other, moved continuously, moved intermittently, have smaller or larger movement ranges, moved at adjustable and/or different speeds (e.g., relative to a discharge rate of head 18), etc. These variations may result in unique and/or dynamically changing weave patterns having desired properties. In addition, the movements of fiber guides 56 may be choreographed with the movements of support 16, with the movements of head 18, with an axial discharge distance and/or rate, and/or with known geometry of structure 14 (e.g., termination points, coupling points, tees, diametrical changes, splices, turns, high-pressure and/or high-temperature areas, etc.).

It is also contemplated that, in some embodiments, only a subset of fiber guides 56 may move, while the other(s) of fiber guides 56 remain stationary. This may still result in dynamically changing weave patterns, but require a less complex head configuration.

Figure 6:
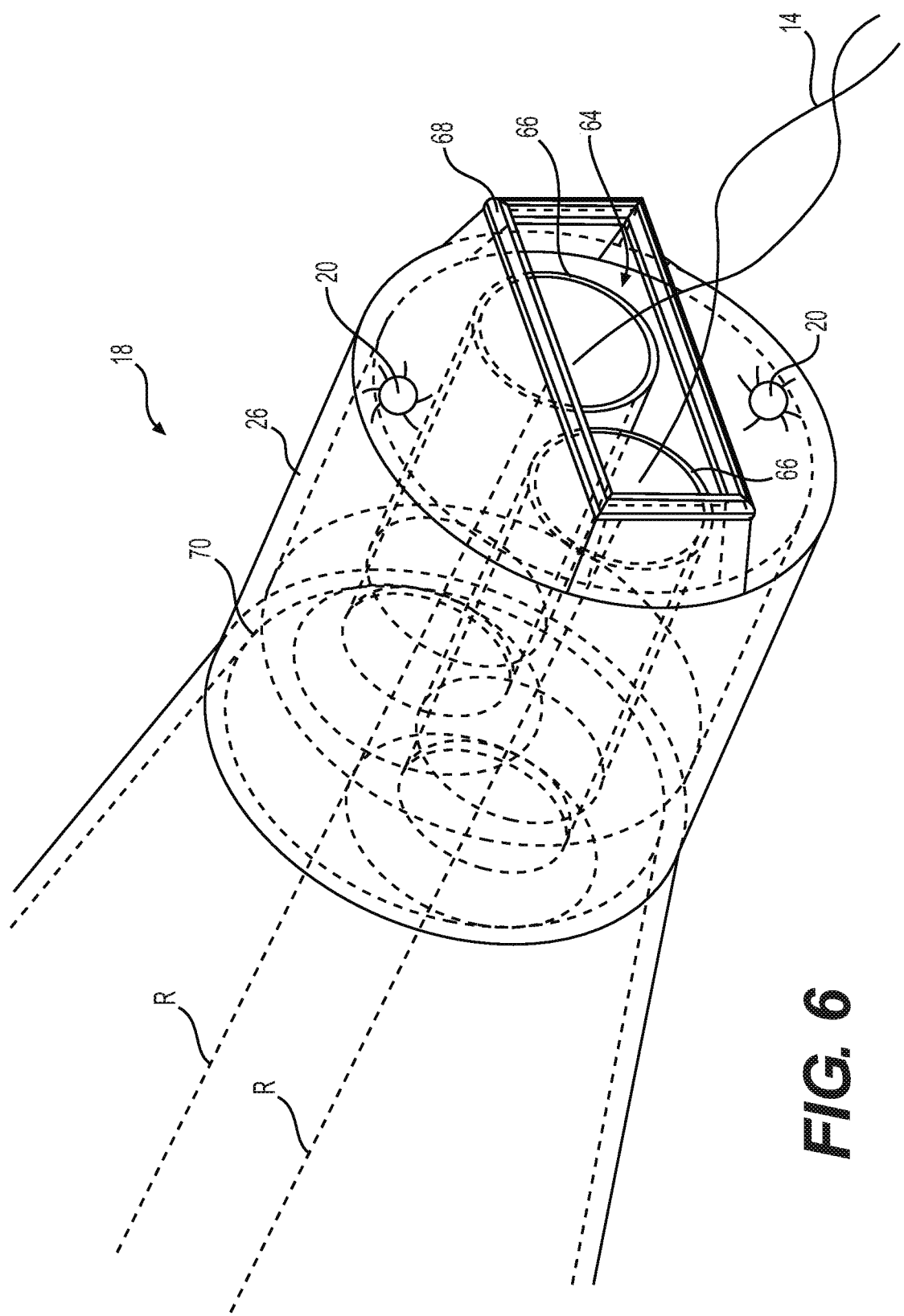

FIG. 6 illustrates another internal weave mechanism 64 that is similar to weave mechanism 54. Like weave mechanism 54, weave mechanism 64 may include a plurality of (e.g., two) fiber guides 66 disposed inside of housing 26 and each having a guide hole configured to receive one or more separate reinforcements R, a common nozzle tip 68 configured to receive and coalesce reinforcements R from all fiber guides 66, and at least one actuator (e.g., a motor) 70 configured to selectively move fiber guides 66 relative to each other. As matrix-coated reinforcements R pass through fiber guides 66, a relative movement between the reinforcements R may be generated by the moving fiber guides 66. The matrix-coated reinforcements may then discharge from head 18 via nozzle tip 68, where resin in the matrix material may be caused to cure from the outside-in by way of cure enhancer(s) 20. This may allow for a first configuration of reinforcements to be dynamically changed to a second configuration of reinforcements, without halting of structure manufacturing.

In contrast to weave mechanism 54, weave mechanism 64 may include only a single pivoting component (e.g., a single arm or disk) to which all fiber guides 66 are mounted. In some embodiments, the pivoting component forms a portion of actuator 70. In other embodiments, however, the pivoting component is separate from actuator 70. With this configuration, rotation of the pivoting component caused by activation of actuator 70 results in a twisting or braiding of the reinforcements R passing through fiber guides 66. It is contemplated that fiber guides 66 may be continuously moved in a single direction, intermittently moved in directions counter to each other, moved through smaller or larger ranges, moved at adjustable and/or different speeds (e.g., relative to a discharge rate of head 18), etc. These variations may result in unique and/or dynamically changing weave patterns having desired properties. In addition, the movements of fiber guides 66 may be choreographed with the movements of support 16, with the movements of head 18, with an axial discharge distance and/or rate, and/or with known geometry of structure 14 (e.g., termination points, coupling points, tees, diametrical changes, splices, turns, high-pressure and/or high-temperature areas, etc.).

Although shown in FIG. 6 as having a generally rectangular shape with a rectangular cross-section, nozzle tip 68 could have any desired shape and cross-section (e.g., circular, ellipsoid, etc.). It is also contemplated that, in some embodiments, only one of fiber guides 66 may move, while the other of fiber guides 66 remains stationary. This may still result in dynamically changing weave patterns, but require a less complex head configuration

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consist. In addition, a pattern of the reinforcement's used to make the composite structures may be dynamically adjusted, for example based on corresponding feature locations within the structures. Operation of systems 10 and 12 will now be described in detail.

At a start of a manufacturing event, information regarding a desired structure 14 may be loaded into systems 10 and 12 (e.g., into controller 24 that is responsible for regulating operations of support 16 and/or head 18). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, etc. It should be noted that this information may alternatively or additionally be loaded into systems 10 and 12 at different times and/or continuously during the manufacturing event, if desired. Based on the component information, one or more different reinforcements and/or matrix materials may be selectively installed and/or continuously supplied into systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). Once structure 14 has grown to a desired length, structure 14 may be disconnected (e.g., severed) from head 18 in any desired manner.

During the growth of structure 14, the information received at the start of (and/or throughout) the manufacturing process may dictate a change in reinforcement pattern and/or density. For example, the information may require the use of a high reinforcement density and/or a spiral or interlocking weave pattern at a particular location within structure 14; a lower reinforcement density and/or straight axial pattern at another location; and/or a low reinforcement density and/or a porous pattern at yet another location. Responsive to the manufacturing progress of head 18, relative to the spatial requirements of structure 14, controller 24 may selectively activate weave mechanism 25 (referring to FIG. 3) and/or 54 (referring to FIGS. 4 and 5) to provide for the change in reinforcement specifications.

For example, structure 14 may need greater strength, higher weight, lower porosity, or anther similar characteristic at a critical area (e.g., at a neck, transition, or mounting area), as compared to a non-critical area (e.g., at a non-structural fill area). As head 18 reaches the critical area, controller 24 may selectively activate actuator 32 and/or actuators 60 to cause a faster and/or greater relative movement between the associated fiber guides in the same or opposing directions. Activation of actuators 32 may include, energizing of electro-magnet 52 to have a particular polarity and/or to generate a magnetic field having a particular strength at a particular time. The magnetic field may interact with permanent magnet(s) 50, thereby generating increased speeds and/or movements of fiber guides 28, 30 against the biases of springs 48. In similar manner, controller 24 may selectively energize the motors of actuators 60 to rotate in a particular direction, at a particular speed, and/or through a particular angle. These operations may cause a density of the resulting reinforcements to increase, and for the reinforcements passing through one fiber guide to overlap and/or overlap to a higher degree the reinforcements passing through another fiber guide. A similar process may be used to switch to another strength, weight, density, weave pattern, and/or porosity level, for example by changing a rate, a range, a timing or direction, and/or which of the fiber guides are moving.

The ability to dynamically change the weave pattern of reinforcements discharging from head 18 may allow for a greater variety of structures 14 to be produced. And the structures 14 that are produce may perform better within their intended environments, and be cheaper and lighter.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalent.

What is claimed is:

1. An additive manufacturing system, comprising:
   a head configured to discharge a composite material including a matrix and a plurality of continuous reinforcements; and
   a weave mechanism configured to selectively adjust a pattern of weaving of the plurality of continuous reinforcements occurring inside of the head.

2. The additive manufacturing system of claim 1, wherein the weave mechanism is configured to adjust at least one of a density and overlap amount of the plurality of continuous reinforcements.

3. The additive manufacturing system of claim 2, wherein the weave mechanism is configured to dynamically adjust the at least one of the density and overlap amount of the plurality of continuous reinforcements as the plurality of continuous reinforcements are discharging from the head.

4. The additive manufacturing system of claim 3, wherein the weave mechanism is configured to dynamically adjust the at least one of the density and overlap amount of the plurality of continuous reinforcements as the plurality of continuous reinforcements are being pulled from the head due to movement of the head.

5. The additive manufacturing system of claim 1, wherein the weave mechanism is configured to correlate a change in the pattern of weaving of the plurality of continuous reinforcements with a specification change of an associated structure manufactured with the composite material.

6. The additive manufacturing system of claim 1, further including a controller configured to:
   receive information regarding a structure to be manufactured; and
   coordinate operation of the weave mechanism with movement of the head based on the information.

7. The additive manufacturing system of claim 1, further including an external cure enhancer configured to enhance curing of the matrix after discharge.

8. The additive manufacturing system of claim 1, further including a support configured to move the head in multiple dimensions during discharging.

9. The additive manufacturing system of claim 1, wherein the weave mechanism includes:
- a first fiber guide having at least one guide hole configured to receive at least a first of the plurality of continuous reinforcements;
- a second fiber guide having at least one guide hole configured to receive at least a second of the plurality of continuous reinforcements; and
- an actuator configured to cause relative movement between the first and second fiber guides during discharge of the at least the first and the at least the second of the plurality of continuous reinforcements.

10. The additive manufacturing system of claim 9, wherein the actuator includes:
- at least one permanent magnet associated with at least one of the first and second fiber guides; and
- an electro-magnet configured to selectively generate a temporary magnetic field that interacts with the at least one permanent magnet.

11. The additive manufacturing system of claim 10, further including at least one resilient member configured to bias at least one of the first and second fiber guides.

12. The additive manufacturing system of claim 9, wherein the actuator includes a motor configured to rotate a pivoting member on which at least one of the first and second fiber guides are mounted.

13. The additive manufacturing system of claim 9, further including a nozzle tip configured to coalesce the at least the first and the at least the second of the plurality of continuous reinforcements.

14. An additive manufacturing system, comprising:
- a head configured to discharge a composite material including a matrix and a plurality of continuous reinforcements;
- a support configured to move the head in multiple dimensions during discharging by the head;
- a weave mechanism configured to selectively adjust a pattern of weaving of the plurality of continuous reinforcements occurring inside of the head; and
- a controller configured to:
  - receive information regarding a structure to be manufactured with the composite material; and
  - coordinate operation of the weave mechanism with movement of the head based on the information.

15. The additive manufacturing system of claim 1, wherein the head is configured to wet the plurality of continuous reinforcements before the weave mechanism adjusts the pattern of weaving of the plurality of continuous reinforcements.

16. The additive manufacturing system of claim 14, wherein the head is configured to wet the plurality of continuous reinforcements with the matrix before the weave mechanism adjusts the pattern of weaving of the plurality of continuous reinforcements.

17. The additive manufacturing system of claim 16, wherein:
the weave mechanism includes:
- a first fiber guide having at least one guide hole configured to receive at least a first of the plurality of continuous reinforcements;
- a second fiber guide having at least one guide hole configured to receive at least a second of the plurality of continuous reinforcements; and
- an actuator configured to selectively cause the first and second fiber guides to translate relative to each other; and the head includes:
- a housing having a supply end configured to receive the plurality of continuous reinforcements, and a discharge end configured to discharge the plurality of continuous reinforcements after being wetted with the matrix;
- an outlet located at the discharge end of the housing and configured to receive the at least the first and the at least the second of the plurality of reinforcements; and
- an external cure enhancer configured to enhance curing of matrix-coated reinforcements discharging from the outlet.

18. The additive manufacturing system of claim 17, wherein the support is configured to move the head away from an anchor point to cause the plurality of reinforcements to be pulled from the head at the same time that the actuator dynamically varies translation of the first and second fiber guides relative to each other.

19. The additive manufacturing system of claim 18, wherein the actuator includes:
- at least one permanent magnet associated with at least one of the first and second fiber guides; and
- an electro-magnet configured to selectively generate a temporary magnetic field that interacts with the at least one permanent magnet.

20. The additive manufacturing system of claim 18, wherein the actuator includes a motor configured to rotate a pivoting member on which at least one of the first and second fiber guides are mounted.

* * * * *